US010445925B2

(12) United States Patent
Tokubo

(10) Patent No.: US 10,445,925 B2
(45) Date of Patent: Oct. 15, 2019

(54) USING A PORTABLE DEVICE AND A HEAD-MOUNTED DISPLAY TO VIEW A SHARED VIRTUAL REALITY SPACE

(71) Applicant: Sony Interactive Entertainment Inc., Tokyo (JP)

(72) Inventor: Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 210 days.

(21) Appl. No.: 15/283,144

(22) Filed: Sep. 30, 2016

(65) Prior Publication Data

US 2018/0096519 A1    Apr. 5, 2018

(51) Int. Cl.
G06T 15/20    (2011.01)
A63F 13/213    (2014.01)
(Continued)

(52) U.S. Cl.
CPC .......... G06T 15/205 (2013.01); A63F 13/211 (2014.09); A63F 13/213 (2014.09); A63F 13/25 (2014.09); A63F 13/30 (2014.09); A63F 13/5255 (2014.09); A63F 13/537 (2014.09); A63F 13/56 (2014.09); A63F 13/843 (2014.09); A63F 13/92 (2014.09); G02B 27/01 (2013.01); G02B 27/017 (2013.01); G06F 1/1626 (2013.01); G06F 1/1686 (2013.01); G06F 1/1694 (2013.01); G06F 3/011 (2013.01); G06F 3/012 (2013.01); G06F 3/017 (2013.01); G06F 3/0304 (2013.01); G06F 3/0346 (2013.01);
(Continued)

(58) Field of Classification Search
CPC ...... G06F 3/012; G06T 19/003; G02B 27/017
See application file for complete search history.

(56) References Cited

U.S. PATENT DOCUMENTS 6,377,401 B1 * 4/2002 Bartlett .................. F41G 3/225
345/8
7,973,702 B2 * 7/2011 Rofougaran .......... G01S 13/426
342/118

(Continued)

OTHER PUBLICATIONS

Andreas Simon et al: "Interaction and Co-located Collaboration in Large Projection-Based Virtual Environments," dated Jan. 1, 2005 (Jan. 1, 2005), Network and Parallel Computing; [Lecture Notes in Computer Science; Lect. Notes Computer], Springer International Publishing, Cham, pp. 364-376, XP019018993, ISSN: 0302-9743; ISBN: 978-3-642-35662-3.

(Continued)

Primary Examiner — Kent W Chang
Assistant Examiner — Nathaniel P Brittingham
(74) Attorney, Agent, or Firm — Penilla IP, APC

(57) ABSTRACT

A method is provided, including the following method operations: tracking a location of a head-mounted display (HMD) in a real space; rendering to the HMD a first view of a virtual reality (VR) space, the first view of the VR space being defined from a perspective determined by the location of the HMD in the real space; tracking a location of a portable device in the real space; rendering to the portable device a second view of the VR space, the second view of the VR space being defined from a perspective determined by the location of the portable device in the real space relative to the location of the HMD in the real space.

15 Claims, 14 Drawing Sheets

(51) Int. Cl.

| | |
|---|---|
| *A63F 13/25* | (2014.01) |
| *A63F 13/30* | (2014.01) |
| *G06F 3/01* | (2006.01) |
| *G06T 19/00* | (2011.01) |
| *G06T 19/20* | (2011.01) |
| *G02B 27/01* | (2006.01) |
| *G06F 3/0481* | (2013.01) |
| *A63F 13/211* | (2014.01) |
| *A63F 13/843* | (2014.01) |
| *A63F 13/5255* | (2014.01) |
| *A63F 13/537* | (2014.01) |
| *A63F 13/92* | (2014.01) |
| *A63F 13/56* | (2014.01) |
| *G06F 1/16* | (2006.01) |
| *G06F 3/03* | (2006.01) |
| *G06F 3/0346* | (2013.01) |

(52) U.S. Cl.
CPC ........ *G06F 3/04815* (2013.01); *G06T 19/006* (2013.01); *G06T 19/20* (2013.01); *A63F 2300/8082* (2013.01); *G02B 2027/0138* (2013.01); *G02B 2027/0187* (2013.01); *G06F 3/013* (2013.01)

(56) References Cited

U.S. PATENT DOCUMENTS

| | | | | |
|---|---|---|---|---|
| 9,277,365 | B1* | 3/2016 | Wilden | H04W 4/029 |
| 9,818,225 | B2* | 11/2017 | Mao | A63F 13/42 |
| 10,068,374 | B2* | 9/2018 | Miller | G06T 19/006 |
| 2005/0008256 | A1* | 1/2005 | Uchiyama | G06T 7/80 |
| | | | | 382/291 |
| 2008/0297437 | A1* | 12/2008 | Takahashi | G02B 27/017 |
| | | | | 345/8 |
| 2009/0103593 | A1* | 4/2009 | Bergamo | H04B 1/707 |
| | | | | 375/146 |
| 2010/0075683 | A1* | 3/2010 | Johansson | H04B 7/15507 |
| | | | | 455/446 |
| 2012/0086631 | A1* | 4/2012 | Osman | A63F 13/655 |
| | | | | 345/156 |
| 2012/0249416 | A1* | 10/2012 | Maciocci | G06F 3/011 |
| | | | | 345/156 |
| 2012/0262558 | A1* | 10/2012 | Boger | G02B 27/0093 |
| | | | | 348/61 |
| 2012/0306850 | A1* | 12/2012 | Balan | G06T 19/006 |
| | | | | 345/419 |
| 2013/0083173 | A1* | 4/2013 | Geisner | G06F 3/013 |
| | | | | 348/51 |
| 2013/0335405 | A1* | 12/2013 | Scavezze | G06T 19/20 |
| | | | | 345/419 |
| 2014/0055352 | A1* | 2/2014 | Davis | G06F 3/017 |
| | | | | 345/156 |
| 2014/0125698 | A1* | 5/2014 | Latta | G06F 3/011 |
| | | | | 345/633 |
| 2014/0162777 | A1* | 6/2014 | Hsu | A63F 13/00 |
| | | | | 463/31 |
| 2014/0248950 | A1 | 9/2014 | Tosas Bautista | |
| 2014/0364208 | A1* | 12/2014 | Perry | G06F 3/14 |
| | | | | 463/31 |
| 2015/0264583 | A1* | 9/2015 | Sundstrom | H04W 16/28 |
| | | | | 342/373 |
| 2015/0269780 | A1* | 9/2015 | Herman | G06T 13/00 |
| | | | | 345/633 |
| 2015/0352437 | A1* | 12/2015 | Koseki | A63F 13/212 |
| | | | | 463/31 |
| 2015/0363976 | A1* | 12/2015 | Henson | H04N 13/0278 |
| | | | | 345/419 |
| 2016/0042221 | A1* | 2/2016 | Mei | G06K 9/0061 |
| | | | | 382/103 |
| 2016/0093108 | A1* | 3/2016 | Mao | A63F 13/42 |
| | | | | 345/633 |
| 2016/0121211 | A1* | 5/2016 | Ladd | A63F 13/355 |
| | | | | 463/33 |
| 2016/0196694 | A1 | 7/2016 | Lindeman | |
| 2016/0266386 | A1* | 9/2016 | Scott | G06F 3/013 |
| 2016/0267712 | A1 | 9/2016 | Nartker et al. | |
| 2016/0292924 | A1* | 10/2016 | Balachandreswaran | G06T 19/006 |
| 2016/0341959 | A1* | 11/2016 | Gibbs | G06K 9/00671 |
| 2016/0378204 | A1* | 12/2016 | Chen | G01C 3/08 |
| | | | | 345/156 |
| 2017/0045941 | A1* | 2/2017 | Tokubo | G06F 3/013 |
| 2017/0084074 | A1* | 3/2017 | Hwang | G06T 15/205 |
| 2017/0206691 | A1* | 7/2017 | Harrises | G06T 11/60 |
| 2017/0206712 | A1* | 7/2017 | Petrovskaya | G06T 19/006 |
| 2017/0262154 | A1* | 9/2017 | Black | G06F 3/011 |
| 2017/0277253 | A1* | 9/2017 | Mullen | G06F 3/01 |
| 2017/0295446 | A1* | 10/2017 | Thagadur Shivappa | H04S 7/304 |
| 2018/0005429 | A1* | 1/2018 | Osman | G06T 7/70 |
| 2018/0075820 | A1* | 3/2018 | Hicks | G09G 5/363 |
| 2018/0093185 | A1* | 4/2018 | Black | A63F 13/537 |
| 2018/0096519 | A1* | 4/2018 | Tokubo | G06F 1/1626 |
| 2018/0096533 | A1* | 4/2018 | Osman | A63F 13/25 |
| 2018/0311585 | A1* | 11/2018 | Osman | A63F 13/655 |

OTHER PUBLICATIONS

Hannah Slay et al: "Interaction and Visualisation across Multiple Displays in Ubiquitous Computing Environments," ACM Int. Conf. Comput. Graph. Virtual Reality Vis. Afr.; ACM Int'l Conf. on Computer Graphics, Virtual Reality and Visualisation in Africa; Proceedings of the 4th Int'l Conf. on Computer Graphics, Virtual Reality, Visualisat, dated Jan. 25, 2006 (Jan. 25, 2006), pp. 75-84, XP058177093, DOI: 10.1145/1108590.1108603; ISBN: 978-1-59593-288-4, p. 83, left col., Sec. 4.2, 1.-2. para. fig. 3.

Invitation to Pay Additional Fees and, Where Applicable, Protest Fee, issued in International Application No. PCT/US2017/054553, dated Dec. 19, 2017 (Dec. 19, 2017) (11 total pages).

Notification of Transmittal of the International Search Report and the Written Opinion issued in International Application No. PCT/US2017/054553, dated Dec. 19, 2017 (Dec. 19, 2017 (18 total pages).

\* cited by examiner

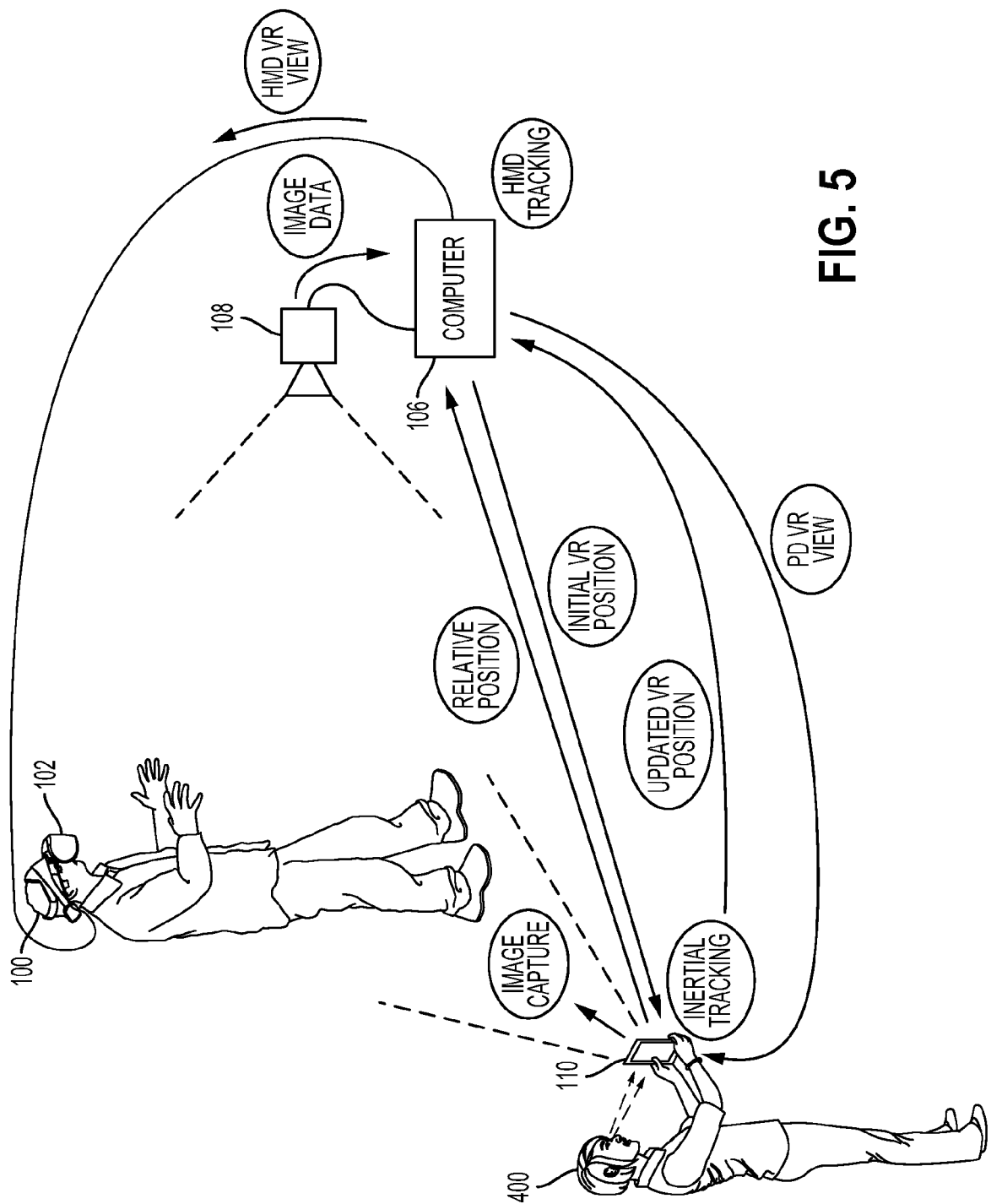

USING A PORTABLE DEVICE AND A HEAD-MOUNTED DISPLAY TO VIEW A SHARED VIRTUAL REALITY SPACE

1. Field of the Disclosure

The present disclosure relates to using a portable device and a head-mounted display (HMD) to view a shared virtual reality (VR) space, and related methods, apparatus, and systems.

BACKGROUND

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

A head-mounted display (HMD) provides an immersive virtual reality experience, as the HMD renders a real-time view of the virtual environment in a manner that is responsive to the user's movements. The user wearing an HMD is afforded freedom of movement in all directions, and accordingly can be provided a view of the virtual environment in all directions via the HMD. Typically, the processing resources required to generate the video for rendering on the HMD are considerable and therefore handled by a separate computing device, such as a personal computer or a game console. The computing device generates the video for rendering to the HMD, and transmits the video to the HMD.

However, when a user is experiencing and interacting in a virtual reality (VR) space via an HMD, the user is effectively isolated from others who may be physically present in the same local vicinity. Such other persons do not have a way to comprehend what the HMD user is experiencing, and are thus unable to share in the VR experience.

It is in this context that implementations of the disclosure arise.

SUMMARY

Implementations of the present disclosure include devices, methods and systems relating to using a portable device and a head-mounted display (HMD) to view a shared virtual reality (VR) space.

In some implementations, a method is provided, including the following method operations: tracking a location of a head-mounted display (HMD) in a real space; rendering to the HMD a first view of a virtual reality (VR) space, the first view of the VR space being defined from a perspective determined by the location of the HMD in the real space; tracking a location of a portable device in the real space; rendering to the portable device a second view of the VR space, the second view of the VR space being defined from a perspective determined by the location of the portable device in the real space relative to the location of the HMD in the real space.

In some implementations, locations in the real space are mapped to locations in the VR space, such that the perspective of the first view is mapped to the location of the HMD in the real space, and the perspective of the second view is mapped to the location of the portable device in the real space.

In some implementations, the location of the HMD in the real space is mapped to a location of a virtual object in the VR space, such that when a rear-facing side of the portable device, opposite a display side of the portable device, is directed towards the HMD, then the second view is configured to display the virtual object.

In some implementations, the virtual object is a virtual character or avatar.

In some implementations, the mapping of locations in the real space to locations in the VR space is changed in response to controller input generated from a controller device operated by a user of the HMD, the controller input being configured to control movement of the virtual object in the VR space.

In some implementations, in response to controller input effecting a translational movement of the virtual object in the VR space, the mapping of locations in the real space to locations in the VR space is translationally shifted to maintain the mapping of the location of the HMD in the real space to the location of the virtual object in the VR space.

In some implementations, tracking the location of the HMD in the real space includes processing inertial data generated from at least one inertial sensor of the HMD.

In some implementations, tracking the location of the HMD in the real space further includes processing image data from a camera configured to capture images of the real space, the image data being processed to identify the image data.

In some implementations, tracking the location of the portable device in the real space includes processing inertial data generated from at least one inertial sensor of the portable device.

In some implementations, tracking the location of the portable device in the real space further includes processing image data from a camera of the portable device, the image data being processed to identify the HMD.

In some implementations, the method further includes: tracking an orientation of the HMD in the real space; wherein a direction of the first view of the VR space is defined by the orientation of the HMD in the real space; tracking an orientation of the portable device in the real space; wherein a direction of the second view of the VR space is defined by the orientation of the portable device in the real space.

In some implementations, the first view includes an indicator that identifies the presence of the portable device in the real space.

In some implementations, the indicator is positioned in the VR space at approximately the location of the perspective from which the second view is defined.

In some implementations, a method is provided, including the following method operations: receiving inertial data from a head-mounted display (HMD), the inertial data being generated from at least one inertial sensor of the HMD; receiving image data from a camera configured to capture images of a real space in which the HMD is disposed; processing the inertial data and the image data to determine a first view location and a first view direction in a virtual reality (VR) space; generating first video data depicting a view of the VR space from the first view location in the first view direction; transmitting the first video data to the HMD for rendering thereon; receiving, from a portable device disposed in the real space, a second view location and a second view direction in the VR space, the second view location being defined based on a location of the portable device relative to a location of the HMD in the real space; generating second video data depicting a view of the virtual environment from the second view location in the second view direction; transmitting the second video data to the portable device for rendering thereon.

In some implementations, the second view location and the second view direction are determined by the portable device using inertial data generated by at least one inertial sensor of the portable device.

In some implementations, receiving the second view location and the second view direction and transmitting the second video data occur over a wireless connection with the portable device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 2A-1 and 2A-2 illustrate a head-mounted display (HMD), in accordance with an embodiment of the disclosure.

FIG. 4-1 illustrates updated mapping of locations between a real space and a VR space in response to translational movement of a virtual object, in accordance with implementations of the disclosure.

FIG. 4-2 illustrates updated mapping of locations between a real space and a VR space in response to a rotational/orientational movement of a virtual object, in accordance with implementations of the disclosure.

FIG. 5 conceptually illustrates data flow for purposes of multiuser viewing of a VR space using an HMD and a portable device, in accordance with implementations of the disclosure.

DETAILED DESCRIPTION

The following implementations of the present disclosure provide devices, methods, and systems relating to using a portable device and a head-mounted display (HMD) to view a shared virtual reality (VR) space.

In various implementations, the methods, systems, image capture objects, sensors and associated interface objects (e.g., gloves, controllers, peripheral devices, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

Figure 1:
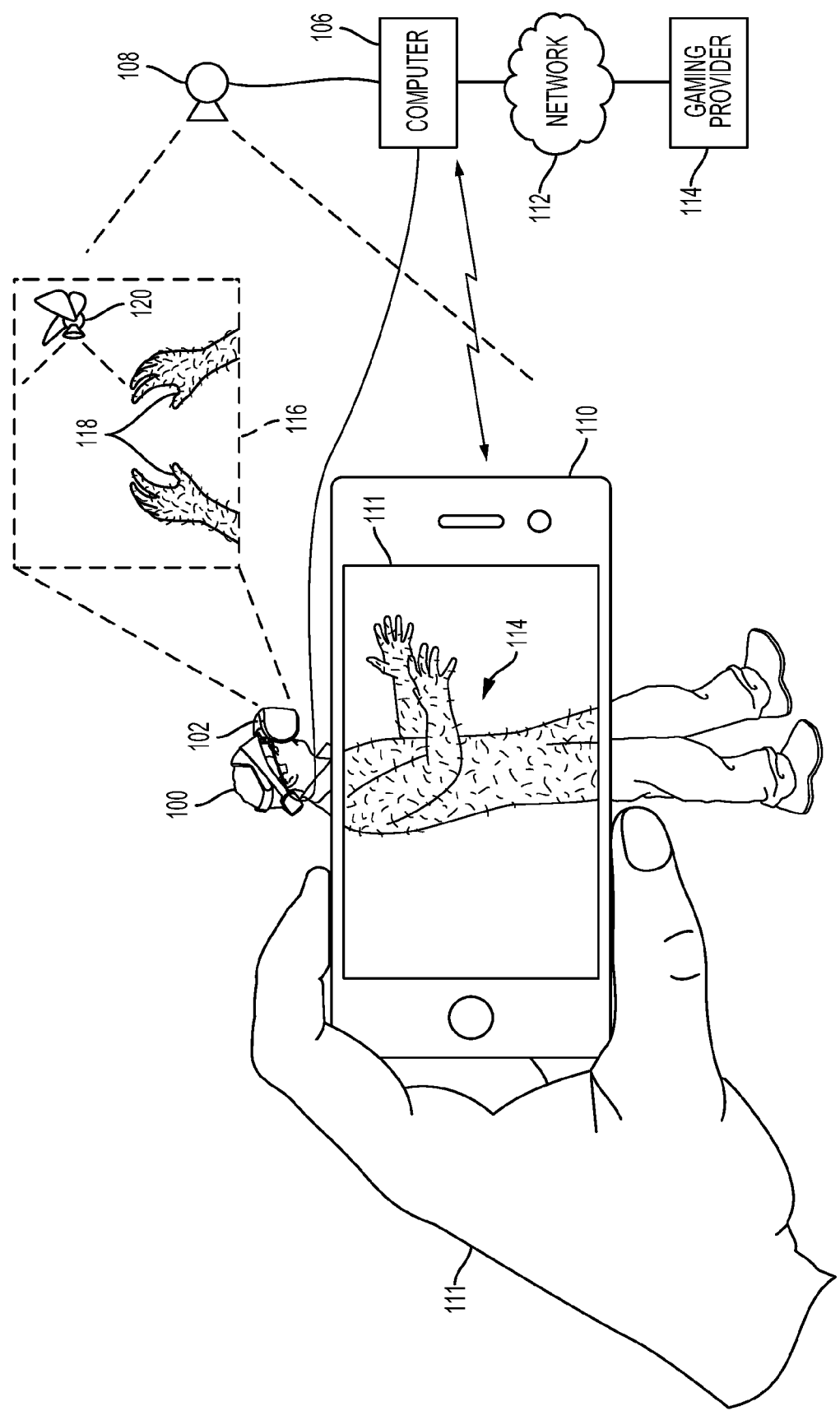
FIG. 1 illustrates a system for interaction with a virtual environment via a head-mounted display (HMD), in accordance with an embodiment of the disclosure.

FIG. 1 illustrates a system for interaction with a virtual environment via a head-mounted display (HMD), in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes.

Thus, the HMD 102 can provide display regions to each of the user's eyes which occupy large portions or even the entirety of the field of view of the user.

In the illustrated embodiment, the HMD 102 is wirelessly connected to a computer 106. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. In various implementations, the computer 106 is configured to transmit over a wired or wireless connection the video and audio from the video game to the HMD 102 for rendering thereon.

In some implementations, the HMD 102 may also communicate with the computer through alternative mechanisms or channels, such as via a network 112 to which both the HMD 102 and the computer 106 are connected.

The user 100 may operate an interface object (e.g. see ref. 104 at FIG. 4) to provide input for the video game. Additionally, a camera 108 can be configured to capture images of the interactive environment in which the user 100 is located. These captured images can be analyzed to determine the location and movements of the user 100, the HMD 102, and the interface object 104. In various implementations, the interface object includes a light which can be tracked, and/or inertial sensor(s), to enable determination of the interface object's location and orientation.

The way the user interfaces with the virtual reality scene displayed in the HMD 102 can vary. For instance, various kinds of single-handed, as well as two-handed controllers can be used. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another implementation, the computer 106 functions as a thin client in communication over a network 112 with a cloud gaming provider 114. In such an implementation, generally speaking, the cloud gaming provider 114 maintains and executes the video game being played by the user 102. The computer 106 transmits inputs from the HMD 102, the directional interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the interface object 104.

In some embodiments, the HMD 102, interface object 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though embodiments in the present disclosure may be described with reference to a head-mounted display, it will be appreciated that in other embodiments, non-head mounted displays may be substituted, including without limitation, portable device screens (e.g. tablet, smartphone, laptop, etc.) or any other type of display that can be configured to render video and/or provide for display of an interactive scene or virtual environment in accordance with the present embodiments.

With continued reference to FIG. 1, a portable device 110 is shown disposed in the same real space as the HMD 102. The portable device 110 is shown being held by the hand 111 of a second user (or spectator). In various implementations, the portable device 110 can be a smartphone, tablet, portable gaming device, or any other type of device having a display screen 111 and which can be tracked in accordance with implementations of the present disclosure. Broadly speaking, the portable device 110 is configured to act as a window into the VR space that the user 100 is viewing through the HMD. The HMD anchors the portable device to the VR space in that the location of the HMD is tied to a specific location in the VR space (e.g. a location of a corresponding character or avatar that is representative of or otherwise controlled by the HMD user), and the location of the portable device 110 relative to the location of the HMD in the real space determines the locational perspective in the VR space from which a view of the VR space is presented on the portable device.

Thus, locations in the real space and the locations in the VR space are mapped to each other. As applied to the illustrated implementation, this means that the locations of the HMD 102 and the portable device 110 in the real space are mapped to respective locations in the VR space. And the VR space locations to which the real space locations of the HMD and portable device are mapped define the viewpoint/perspective from which corresponding views of the VR space are displayed on the HMD and portable device, respectively. This configuration allows the portable device to act as a window or viewer of the VR space that the HMD user 100 is experiencing via the HMD.

Prior to initiating viewing of the VR space on the portable device, a calibration can be performed. The calibration entails identifying the location of the portable device in the real space relative to the location of the HMD in the real space. As the HMD 102 is used to view the VR space by the HMD user 100, its location and orientation in the real space determine a corresponding view location and orientation in the VR space.

The location and orientation of the HMD in the real space can be determined from analysis of captured images received from the camera 108, which is stationary at a fixed position and orientation in the real space, for example by identifying features of the HMD such as lights which are configured to enable tracking of the HMD. Further, the location of the portable device 110 relative to the HMD 102 can be determined using a rear-facing camera of the portable device (on a back side of the portable device opposite the front side which has the display 111) to capture images of the HMD in the real space, and analyzing the captured images to determine the location of the portable device relative to the location of the HMD. Based on this relative location, the location of the portable device in the real space can also be expressed independently. However, it will be appreciated that the location of the portable device in the real space is known through its relative location to the HMD 102, whose location is known via the camera 108, which is at a fixed position.

Thus, the locations and orientations of the HMD 102 and the portable device 110 in the real space can be calibrated through image-based mechanisms. However, in some implementations, once calibrated, tracking of the HMD and the portable device can be primarily effected through inertial sensors of both the HMD and the portable device. Examples of inertial sensors include accelerometers, gyroscopes, and magnetometers. As the sample rates of inertial sensors are generally faster than the frame rates of cameras, and in view of the lower amount of computing resources required for inertial sensor-based tracking versus optically-based tracking, in some implementations, primary reliance is placed on inertial-based tracking to provide faster tracking of the HMD and/or the portable device once calibration is established as discussed. In some implementations, optical tracking is invoked periodically to verify the tracking accuracy, and recalibrate the tracked locations of the HMD and/or portable device if necessary (e.g. due to sensor drift effects).

With continued reference to FIG. 1, in the illustrated implementation, the HMD 102 is correlated to a character or avatar 114 in the VR space. That is the location of the HMD 102 in the real space corresponds to, or is mapped to, the location of the character in the VR space. The correspondence can be more specific, e.g. mapping the location of the HMD to the location of a portion of the character, such as the head, in the VR space. As the HMD 102 is approximately collocational with the user 100, then when the rear-facing camera of the portable device is directed towards the user 100 and/or HMD 102, the view of the VR space that is rendered on the portable device 100 shows the character 114 in place of the user 100. Hence the second user is able to see the user 100 as he is represented in the VR space (as character 114). It will be appreciated that the orientation of the portable device in this manner orients the view direction, of the view into the VR space that is rendered to the portable device 110, towards the character 114 in the VR space.

In some implementations, movements and gestures by the user 100 are tracked in addition to the HMD 102, and such will control corresponding movements and gestures by the character 114 that represents the user 100. For example, arm movements by the user may effect similar arm movements by the character 114. In some implementations, this can be achieved by tracking the user 100 using image recognition techniques. In such implementations, the images of the user can be captured by either or both of the camera 106 and the camera of the portable device 110. In some implementations, movements of at least a part of the character 114 are determined by tracking movements of a motion controller, which may be tracked using image-based tracking and/or inertial tracking.

With continued reference to FIG. 1, the view 116 of the VR space is rendered to the HMD 102. In the view 116 the arms 118 of the character 114 are shown. Thus, the user 100 also sees himself as he is represented/portrayed in the VR space. As noted above, the movements of the arms 118 of the character 114 may be controlled by movements of the user's 100 actual arms, thus providing a strong sense of connection to the character 114 for the user 100.

Additionally shown in the view 116 is an indicator 120 that is indicative of the presence of the portable device 110 in the vicinity of the user 100 and the HMD 102 in the real space. The indicator 120 positioned in the view 116 so as to indicate, at least approximately, the location of the portable device. In some implementations, the indicator 120 is positioned in the VR space at the view location from which the portable device's view of the VR space is defined. In some implementations, if the view location defining the perspective of the portable device's view of the VR space does not fall within the HMD's view of the VR space, then the indicator may be positioned in the HMD's view 116 at a location suggesting where the portable device is located, e.g. along a side of the view 116 that is on the same side as the location of the portable device's view location. The indicator 120 can call attention to the fact that another user is viewing the VR space, as the user 100 may not be aware of the other user, or may not be able to otherwise know where the other user is located. In the illustrated implementation, the indicator 120 is conceptualized as a flying camera with wings. However, it will be appreciated that in other implementations, the indicator 120 may have any shape or form.

Figures 1, 2A:
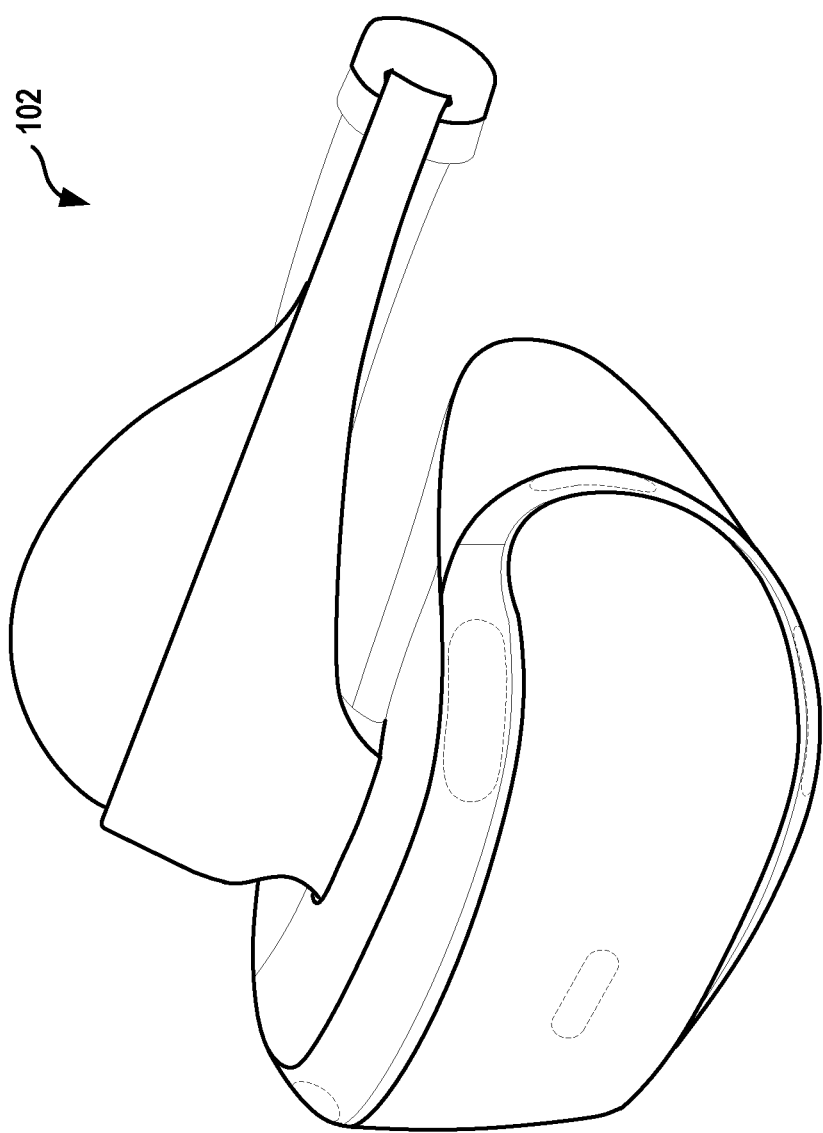
Figures 2, 2A:
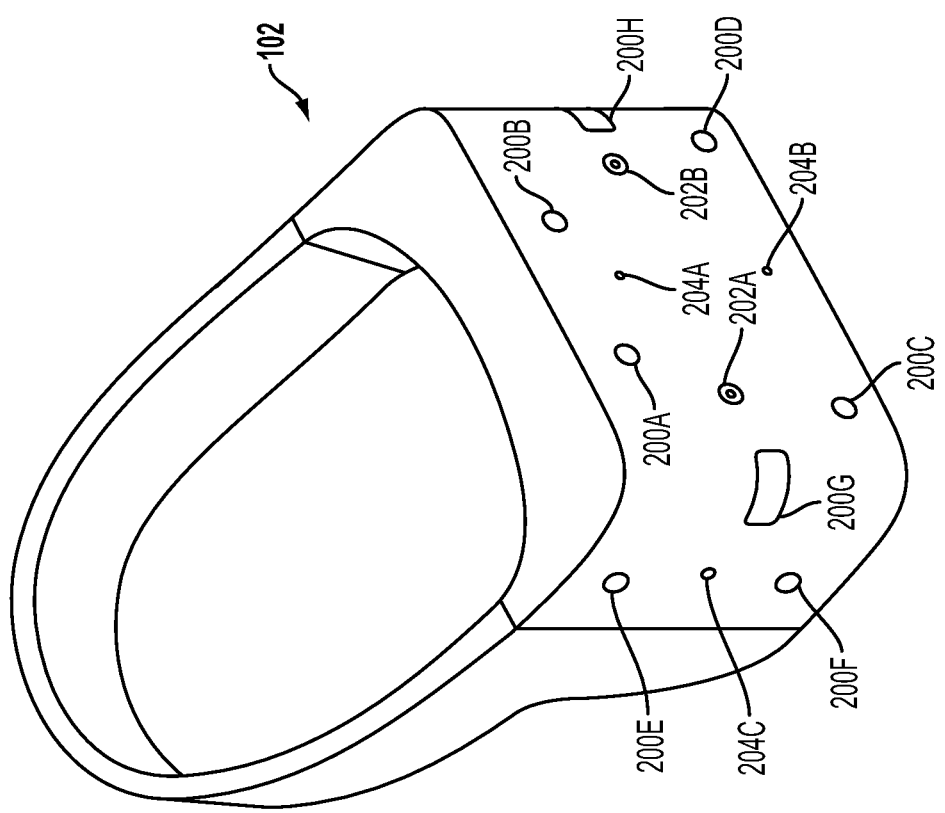

FIGS. 2A-1 and 2A-2 illustrate a head-mounted display (HMD), in accordance with an embodiment of the disclosure. FIG. 2A-1 in particular illustrates the Playstation® VR headset, which is one example of a HMD in accordance with implementations of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

Figure 3:
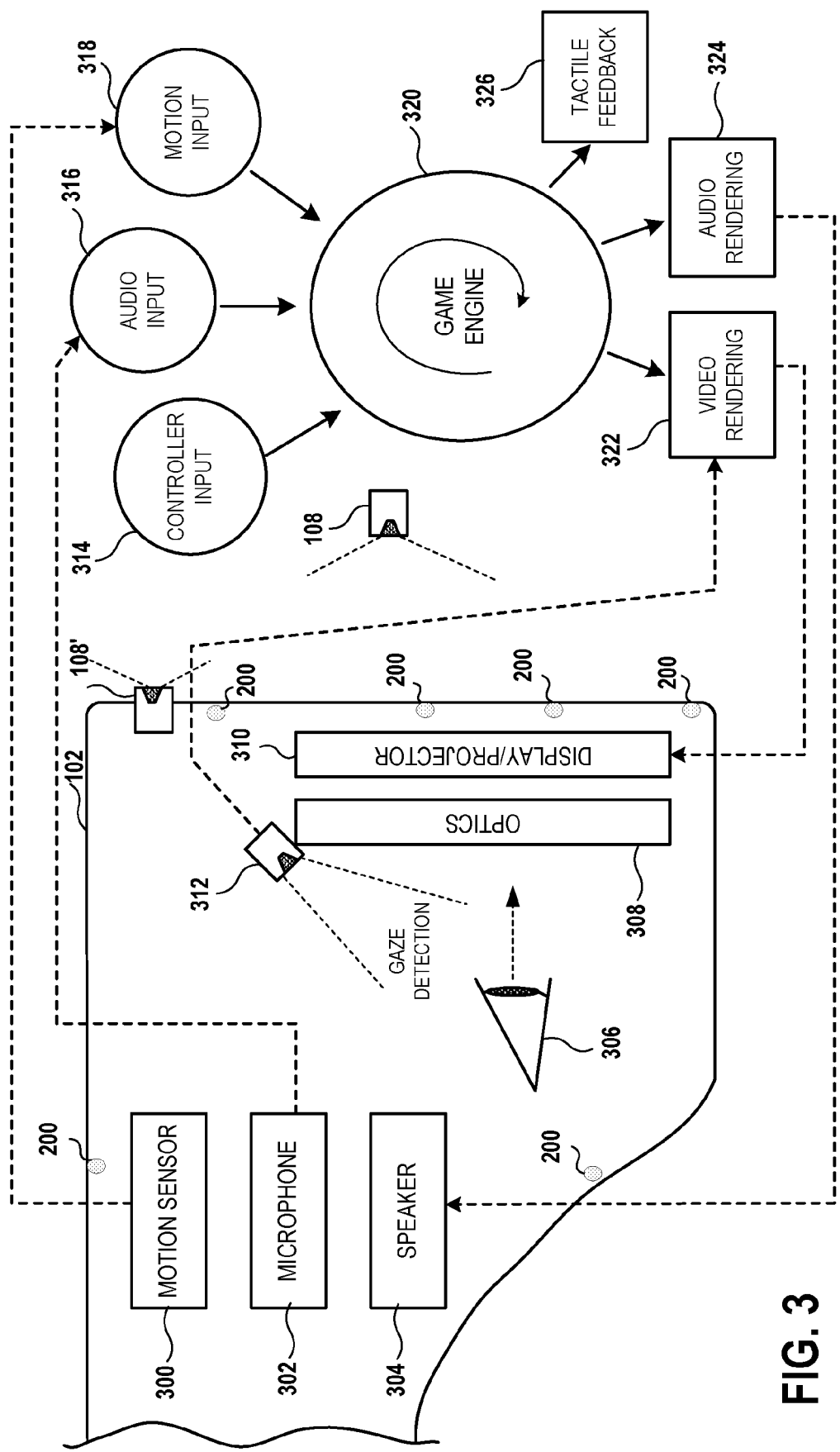
FIG. 3 conceptually illustrates the function of an HMD in conjunction with an executing video game, in accordance with an embodiment of the disclosure.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 2B:
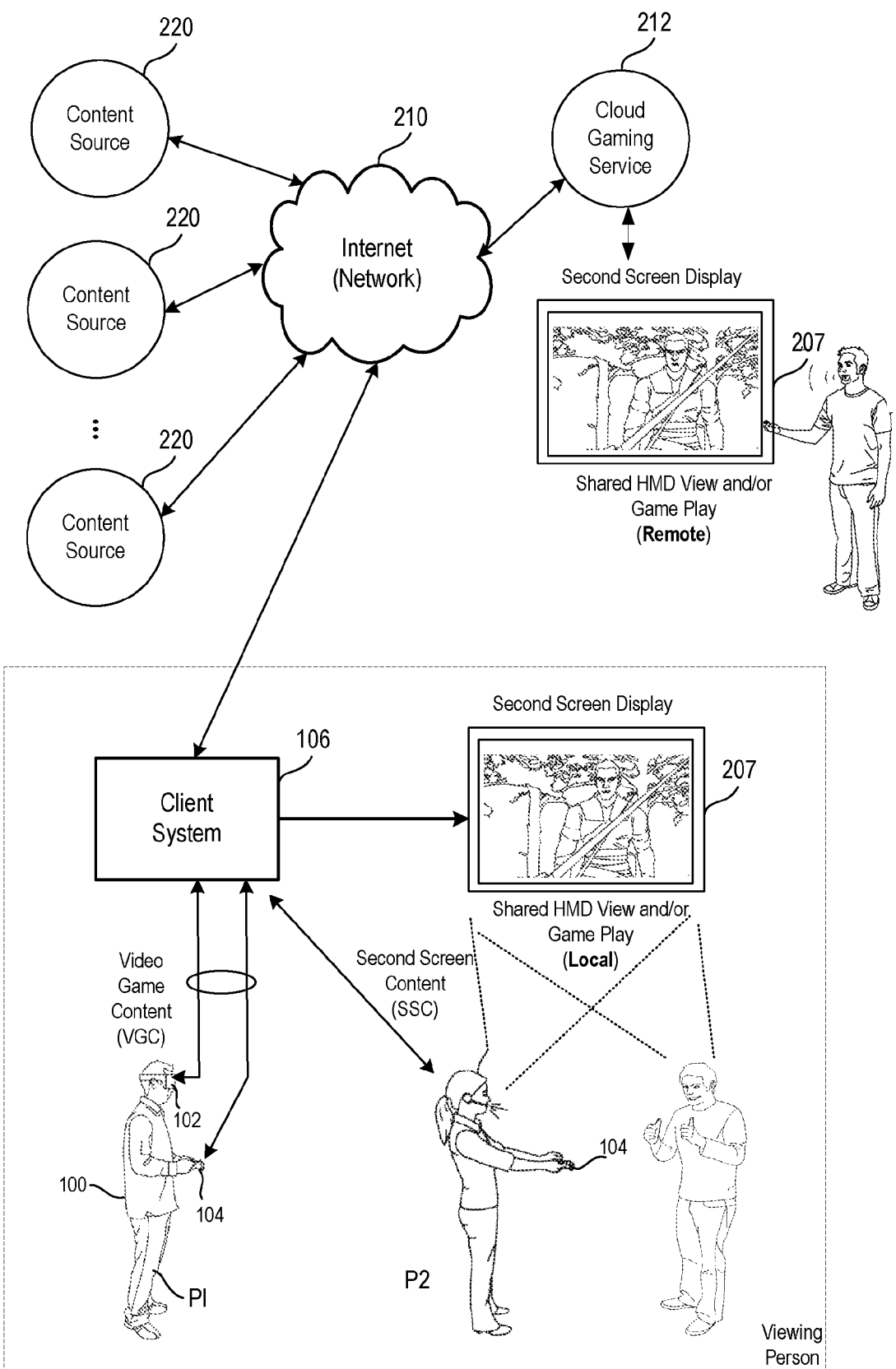
FIG. 2B illustrates one example of an HMD user interfacing with a client system, and the client system providing content to a second screen display, which is referred to as a second screen, in accordance with one embodiment.

FIG. 2B illustrates one example of an HMD 102 user 100 interfacing with a client system 106, and the client system 106 providing content to a second screen display, which is referred to as a second screen 207. The client system 106 may include integrated electronics for processing the sharing of content from the HMD 102 to the second screen 207. Other embodiments may include a separate device, module, connector, that will interface between the client system and each of the HMD 102 and the second screen 207. In this general example, user 100 is wearing HMD 102 and is playing a video game using a controller, which may also be directional interface object 104. The interactive play by user 100 will produce video game content (VGC), which is displayed interactively to the HMD 102.

In one embodiment, the content being displayed in the HMD 102 is shared to the second screen 207. In one example, a person viewing the second screen 207 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 207 along with the VGC received from the HMD 102.

Accordingly, the interactivity by other users who may be co-located or remote from an HMD user can be social, interactive, and more immersive to both the HMD user and users that may be viewing the content played by the HMD user on a second screen 207. As illustrated, the client system 106 can be connected to the Internet 210. The Internet can also provide access to the client system 106 to content from various content sources 220. The content sources 220 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 220, or from a local user, or a remote user.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation ®Move motion controller) or directional interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as directional interface object 104. The tactile feedback may take the form of various kinds of tactile sensations, such as vibration feedback, temperature feedback, pressure feedback, etc. The directional interface object 104 can include corresponding hardware for rendering such forms of tactile feedback.

Figure 4:
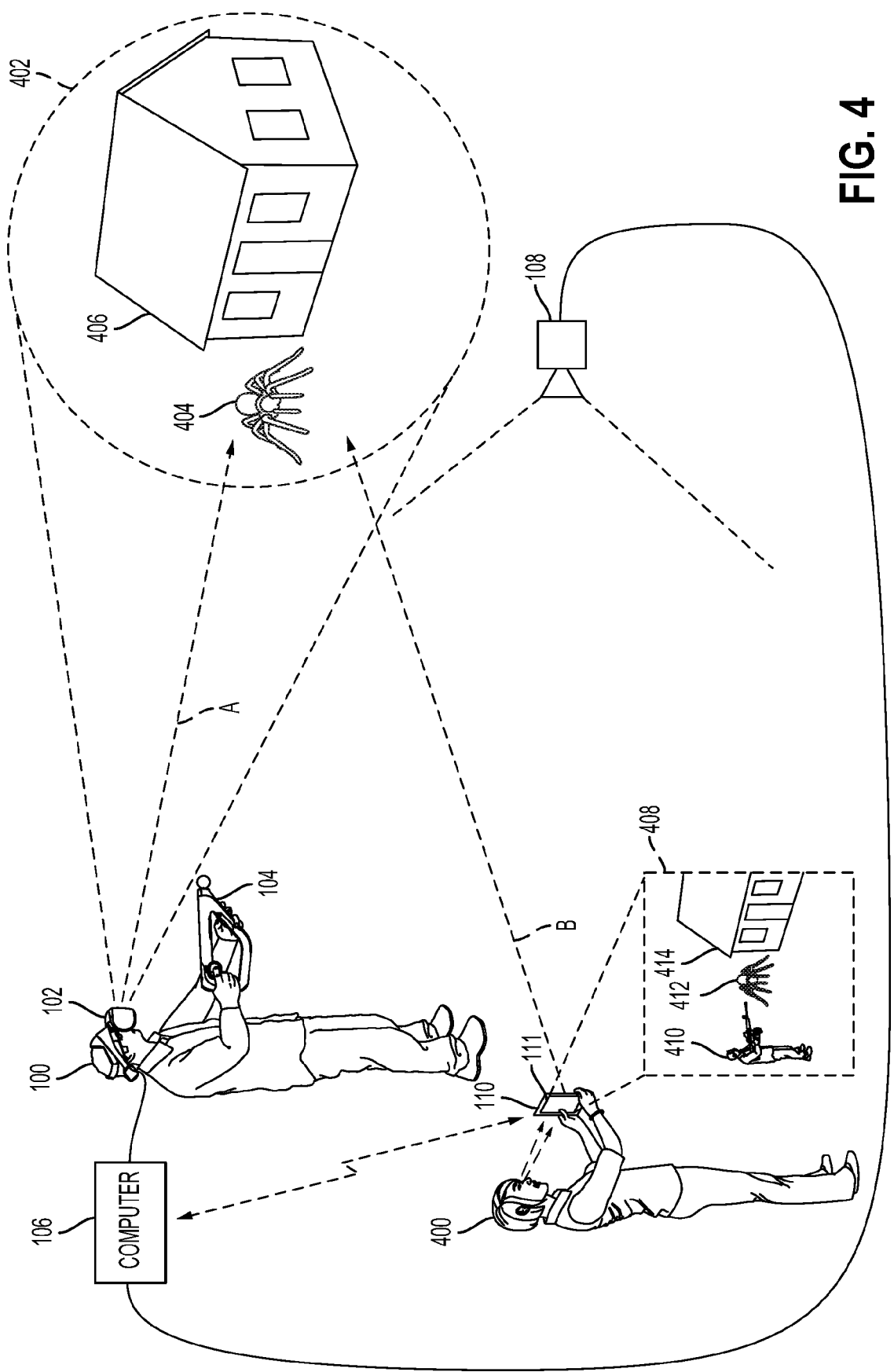
FIG. 4 illustrates a system for multiplayer viewing of a shared VR space using an HMD and a portable device, in accordance with implementations of the disclosure.
Figures 1, 4:
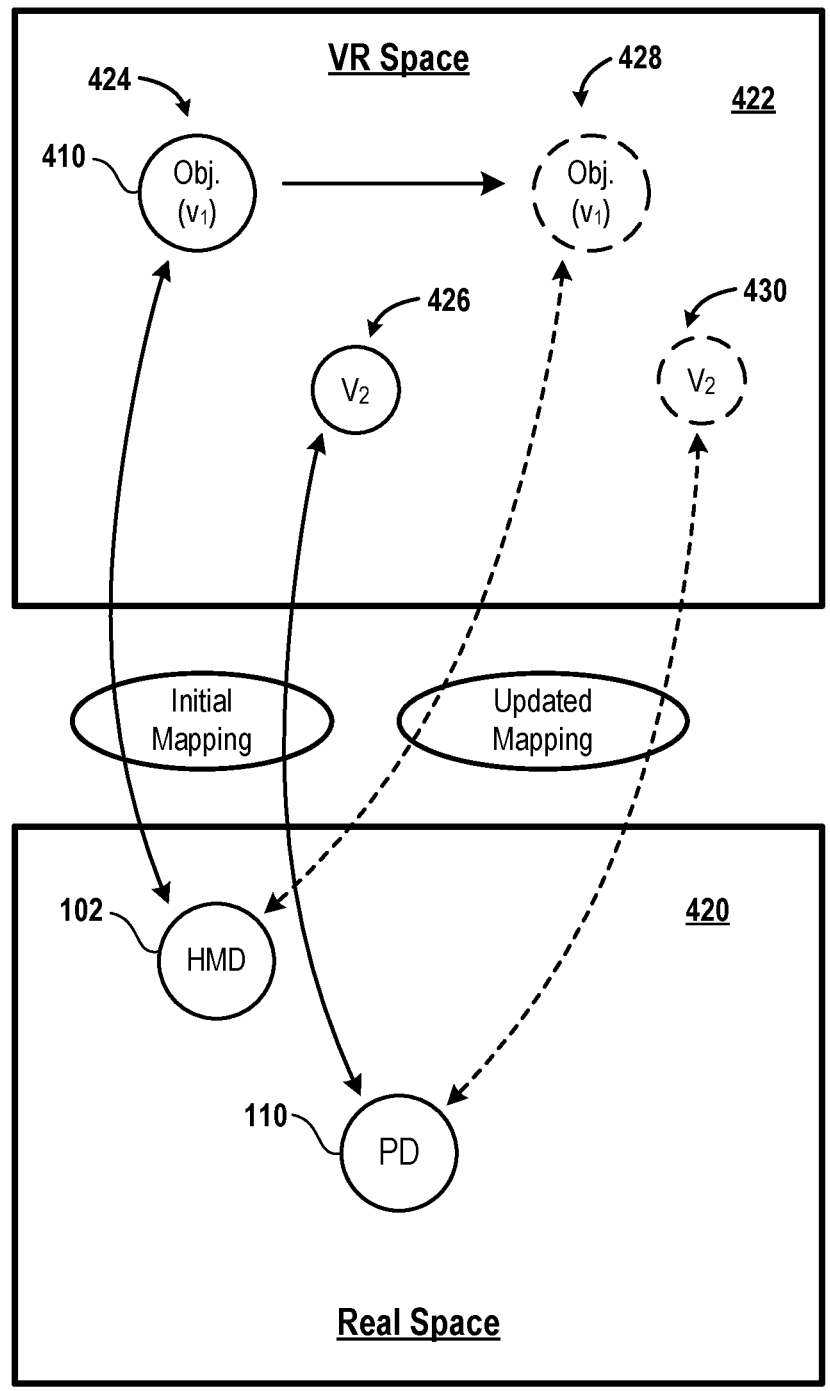
Figures 2, 4:
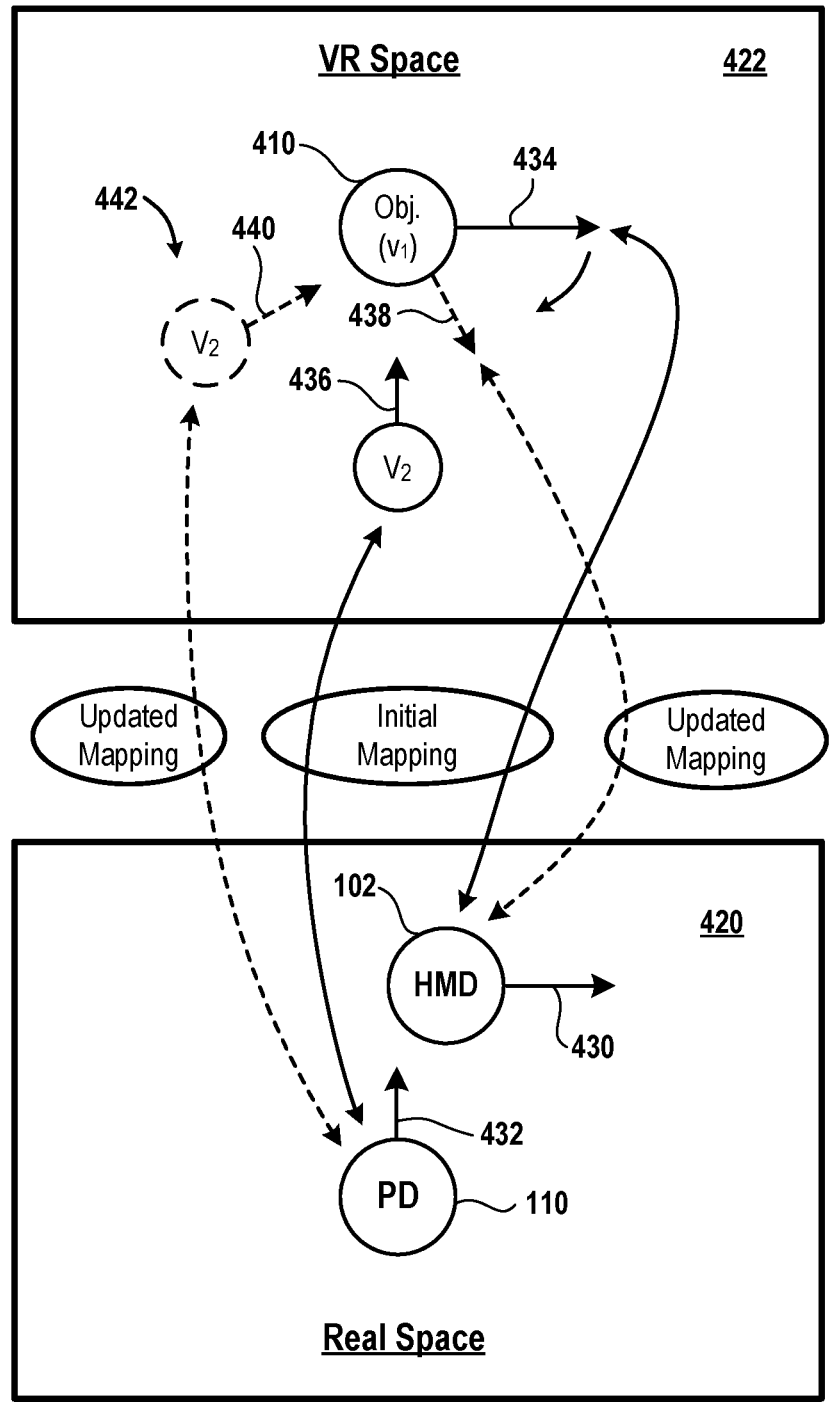

FIG. 4 illustrates a system for multiplayer viewing of a shared VR space using an HMD and a portable device, in accordance with implementations of the disclosure. As shown, the primary user 100 views a VR space 402 through an HMD 102. The location and orientation of the HMD can be determined and tracked based on inertial data generated by inertial sensors of the HMD and/or analysis of captured images by the camera 108, which is configured to capture images of the real space in which the HMD is disposed.

The view of the VR space 402 that is presented through the HMD 102 to the primary user 100 is from a perspective A. The perspective A is defined by a location in the VR space that corresponds to the physical location of the HMD 102 in the interactive real space, and a direction in the VR space that corresponds to the orientation of the HMD 102 in the real space. In the illustrated implementation, the VR space includes a virtual character 404 and a building 406, both of which may be seen in the view of the VR space presented via the HMD 102.

A secondary user 400 (or spectator) in the same interactive real space operates a portable device 110 having a display 111. The location and orientation of the portable device 110 can be determined and tracked based on inertial data generated by inertial sensors of the portable device 110 and/or analysis of captured images by a camera of the portable device 110, which can be a rear-facing camera positioned on a back side of the portable device 110 that is opposite the front side on which the display 111 is formed.

A view 408 of the VR space 402 is presented on the display 111 of the portable device 110 from a perspective B. In the illustrated implementation, the perspective B is defined by a location in the VR space that corresponds to the physical location of the portable device 110 in the interactive real space, and a direction in the VR space that corresponds to the orientation of the portable device in the real space. In the view 408, the character 412 and the building 414 are shown from a different perspective than that utilized for the view presented on the HMD 102.

Additionally, in the view 408, the secondary user 400 is able to view an avatar 410 that is the representation of the primary user 100 and/or the HMD 102 in the VR space. In other words, the field of view for the view 408 encompasses in the location in the VR space that corresponds to the physical location of the HMD 102 in the interactive real space. In various implementations, the specific field of view for the view 408 of the VR space that is presented on the portable device 110 may vary, and may be set at a predefined amount, or determined based upon various factors, such as the screen size of the portable device, the aspect ratio of the portable device's display, the screen resolution, etc. In some implementations, the field of view in the VR space is substantially determined by the field of view in the real space of the rear-facing camera of the portable device, such that for real space regions falling within the field of view of the rear-facing camera, corresponding VR space regions are portrayed in the view 408.

In some implementations, the primary user 100 drives the interactivity in the VR space 402 through, for example, operation of a controller 104, and/or detected movements and gestures of the user 100. The movements and gestures of the user 100 can be detected using image recognition techniques applied to captured images from the camera 108 which include the user 100, and may also be detected based on the detected movements of the HMD 100 or a controller 104. In this manner the controller 104 is a motion controller having motion sensing hardware and/or that is detectable through image-based tracking of a trackable feature on the controller. Additionally, the controller 104 may include any of a variety of input devices, such as a joystick, buttons, directional pad, touch-sensitive pad, trigger, etc. Examples of controllers include the Playstation® Move motion controller, the DualShock®4 wireless controller, the Playstation® VR Aim controller, etc.

The primary user 100 may thus drive the interactivity in the VR space 402 by, for example, controlling the activity (including movements in the VR space) of a virtual object in the VR space, such as the character 410 which is representative of the user 100, and/or other virtual objects which may be controlled/operated/manipulated by the user in the VR space, such as a weapon, tool, wand, pointer, hand/glove, keyboard, book, computer, etc.

It will be appreciated that in some implementations, the virtual object can be moved in response to user input in a manner that changes the mapping of the real and VR spaces in accordance with the movement of the virtual object. One example for illustrative purposes is the movement of the character 410 by the user 100 in response to operation of an input device of the controller 104, e.g. pushing a joystick forward to effect forward movement of the character 410 in the VR space. As the character 410 is the representation of the primary user 100 in the VR space and thus serves as the basis for defining the virtual location in the VR space that corresponds to the HMD 102, then the location of the HMD 102 will be remapped to the updated location of the character 410 in the VR space as it is moved.

To provide additional clarity regarding this concept, FIG. 4-1 illustrates updated mapping of locations between a real space and a VR space in response to translational movement of a virtual object, in accordance with implementations of the disclosure. In the illustrated implementation, overhead views of a real space 420 and VR space 422 are shown, for which locations of the real and VR spaces are mapped to each other. The HMD 102 and portable device 110 are shown in the real space 420 at specific locations. Initially, the location of the HMD 102 in the real space 420 is mapped to the location of a virtual object 410 (e.g. a character representative of the HMD user) shown in the VR space 422. The location of the virtual object 410 defines a viewpoint $V_1$ in the VR space from which a view of the VR space is provided to the HMD 102. The location of the portable device 110 in the real space 420 is mapped to a location 426 in the VR space 422, that is the location of a viewpoint $V_2$ from which the view of the VR space is provided to the portable device 110.

In response to a command, for example an input provided from a controller device operated by the HMD user, the virtual object 410 moves to an updated location 428 in the VR space 422. Accordingly, the location of the HMD 102 in the real space 420 is now remapped to the updated location 428 in the VR space. Furthermore, the location of the portable device 110 in the real space is also remapped to a location 430 in the VR space, so that the relative location of the viewpoint $V_2$ to the virtual object 410 is maintained. In this implementation, it will be appreciated that the specific locational correspondence between the HMD 102 and the virtual object 410 defines the mapping of the real space to the VR space.

FIG. 4-2 illustrates updated mapping of locations between a real space and a VR space in response to a rotational/orientational movement of a virtual object, in accordance with implementations of the disclosure. In the illustrated implementation, the locations of the HMD 102 and the portable device 110 in the real space are mapped to locations of the virtual object 410 and a viewpoint $V_2$ in the VR space. Furthermore, initially the orientation of the HMD (ref. 430) in the real space 420 is mapped to an orientation of the virtual object indicated at ref. 434, which may be a facing direction of the virtual object 410 when the virtual object 410 is a character or avatar, and further defines the view direction for the view of the VR space that is rendered to the HMD 102. The orientation of the portable device (ref. 432) in the real space is configured to direct a rear-facing side of the portable device towards the HMD 102. This orientation of the portable device 110 is mapped to a view direction 436 from the viewpoint $V_2$ in the VR space that is directed towards the virtual object 410.

In the illustrated implementation, in response to a command, e.g. via a controller operated by the HMD user, the orientation of the virtual object 410 is rotated to an updated orientation indicated at ref. 438. The orientation of the HMD 102 is remapped to the updated orientation 438, effectively rotating the mapping of the real space to the virtual space about the location of the virtual object 410. Accordingly, the location of the portable device 110 is remapped to an updated location 442 and an updated view direction 440, thereby maintaining the relative locations and orientations of the virtual object 410 and viewpoint V2.

Thus it will be appreciated that depending on the type of input received from the HMD user, the mapping of locations and orientations of the HMD and the portable device in the real space to corresponding locations and orientations/view directions in the VR space, may or may not change, and that such is driven by the HMD user in the present implementations.

FIG. 5 conceptually illustrates data flow for purposes of multiuser viewing of a VR space using an HMD and a portable device, in accordance with implementations of the disclosure. At an initial calibration stage, the locations and orientations of the HMD 102 and the portable device 110 in the local interactive real space are determined. The camera 108 captures images of the real space in which the HMD 102 is disposed and generates image data. The captured image data is analyzed by the computer 106 to identify and track the HMD 102, e.g. by identifying and tracking a plurality of lights on the HMD 102. This establishes the location and orientation of the HMD 102 in the real space, as the camera 108 is at a fixed location and orientation.

The portable device 110 is held by the secondary user 110 in a manner so that a rear-facing camera of the portable device 110 captures images of the HMD 102 in the real space. By analyzing the captured images to identify and track the HMD 102, the portable device 110 can determine its location and orientation relative to that of the HMD. This relative position information (including location and orientation relative to the HMD) can be communicated to the computer 106, which may use the relative position information in combination with the known position of the HMD to determine the initial real space position of the portable device, and also determine the initial VR space position to which such is mapped.

The initial VR position can be communicated back to the portable device 110, which is now enabled to determine its VR position independently based on either or both of inertial data and captured image data generated by the portable device, which may be used to first determine its real space position before determining the VR position based on the real space position. In some implementations, the portable device 110 determines its real space position principally based on inertial data generated by one or more inertial sensors of the portable device 110. As noted above, inertial sensor-based tracking generally provides faster performance with lower resource utilization. Based on the determined real space position, an updated VR position is determined by the portable device 110 and transmitted to the computer 106. The computer processes the updated VR position to generate the appropriate view of the VR space (from the perspective of the VR position) and transmits the view as video data back to the portable device 110 for rendering thereon.

To ensure accurate tracking of the portable device 110 in the real space, image-based tracking can be invoked periodically in a manner similar to that described above. That is, the position of the HMD as determined from captured images from the camera 108 can be used in conjunction with captured images by the rear-facing camera of the portable device 110 to determine the position of the HMD and the relative position (to the HMD) of the portable device. The relative position can then be processed to determine the real space position of the portable device 110 and its corresponding VR position.

Figure 6:
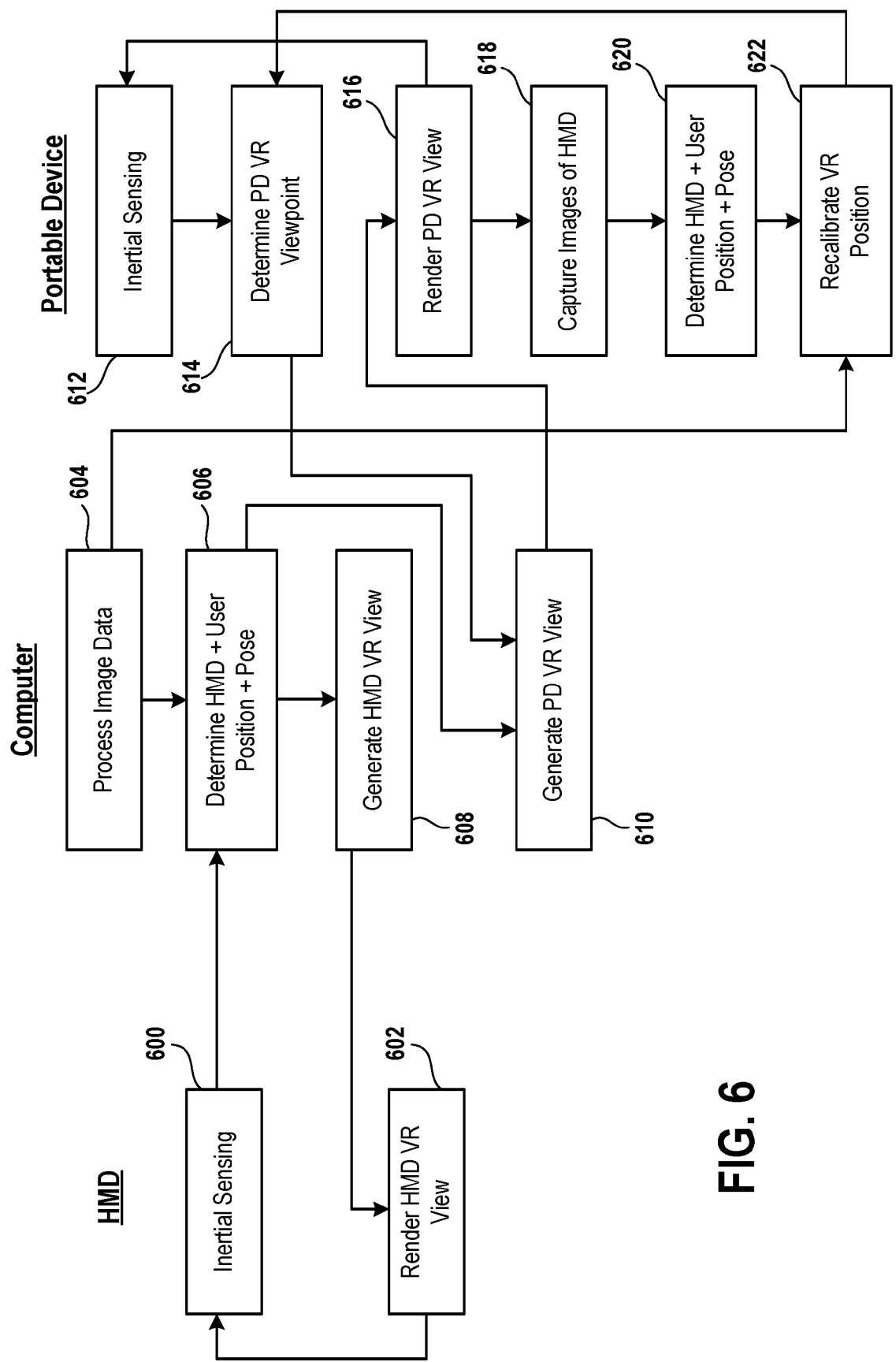
FIG. 6 illustrates operations performed by an HMD, a portable device, and a computer to provide multiuser viewing of a shared VR space, in accordance with implementations of the disclosure.

FIG. 6 illustrates operations performed by an HMD, a portable device, and a computer to provide multiuser viewing of a shared VR space, in accordance with implementations of the disclosure. At operation 600, the HMD performs inertial sensing by processing inertial data generated by one or more inertial sensors of the HMD. Based on the inertial data, the computer at operation 606 determines the position (including location and orientation) of the HMD in an interactive real space. The computer uses the position of the HMD at operation 608 to generate a primary view of the VR space from the perspective of a corresponding position in the VR space, which may be the position of a virtual object that is representative of the HMD user. At operation 602, the HMD receives and renders the primary view for viewing by the HMD user.

Additionally, at operation 604, the computer may analyze image data received from a camera configured to capture images of the interactive real space in which the HMD is disposed. The image data may be analyzed to improve the position determination of the HMD, and may further be analyzed to identify a position and/or pose of the user, such as movements of the user's limbs, etc.

At operation 612, the portable device performs inertial sensing by processing inertial data generated by one or more inertial sensors of the portable device. The inertial data is analyzed to determine the position (including the location and orientation) of the portable device in the real space. Based on this position, at operation 614, the portable device determines its corresponding VR viewpoint and view direction in the VR space. The portable device VR viewpoint and view direction are communicated to the computer, which at operation 610 generates the appropriate view of the VR space from the VR viewpoint and view direction for the portable device. Video data depicting such a view is transmitted to the portable device and rendered thereon at operation 616, thereby providing the appropriate view of the VR space on the portable device.

Though in some implementations, inertial and/or image based tracking is used to determine real space position, which is in turn used to determine VR space position, in other implementations, inertial and/or image based tracking can be directly processed to determine VR space position, without specifically determining real space position first.

In some implementations, the position and/or pose of the HMD user can be used for purposes of generating the portable device's VR view. For example, if the HMD user's arms or legs are in a particular pose, then a representative character of the HMD user may have a similar pose, and when the portable device is directed towards the HMD user, then the rendering view of the VR space on the portable device may show the character having the similar pose.

At operation 618, the portable device uses its rear-facing camera (positioned on a back side of the portable device opposite a front side on which the display of the portable device is positioned) to capture images of the real space including the HMD. At operation 620, the portable device analyzes the captured images to identify the HMD and determine the position of the portable device relative to that of the HMD. At operation 622, using this relative position information, along with HMD position information (determined from processed image data at operation 604) from the computer, the portable device recalibrates its VR position at operation 622. As noted, this is useful to ensure the accuracy of the inertial-based tracking and recalibrate the real space position and VR space position determination by the portable device.

In some implementations, the calibration is performed periodically at predefined time intervals. In some implementations, the calibration is performed at varying intervals depending upon the amount or intensity (e.g. speed, acceleration, changes thereto) of movement of the HMD and/or the portable device. For example, in some implementations, the calibration is performed more frequently when movement levels of the HMD and/or portable device are higher, and less frequently when movement levels of the HMD and/or portable device are lower. In some implementations, an amount of movement (including translational and/or orientational movement) by the HMD and/or the portable device over time is measured, and when the amount of movement reaches a predefined amount, then the calibration is performed.

In some implementations, the captured images by the camera of the portable device can be analyzed to determine the position and/or pose of the HMD user. This information can be combined with the image data processed from the camera that is connected to the computer at operations 604 and 606, to improve the determination of the position and/or pose of the HMD user. The image data from both cameras can be processed in a stereoscopic manner to provide improved three-dimensional understanding of the HMD user's pose. This can in turn be used to, for example, control a corresponding pose of a virtual character or avatar that represents the HMD user in the VR space.

Figure 7:
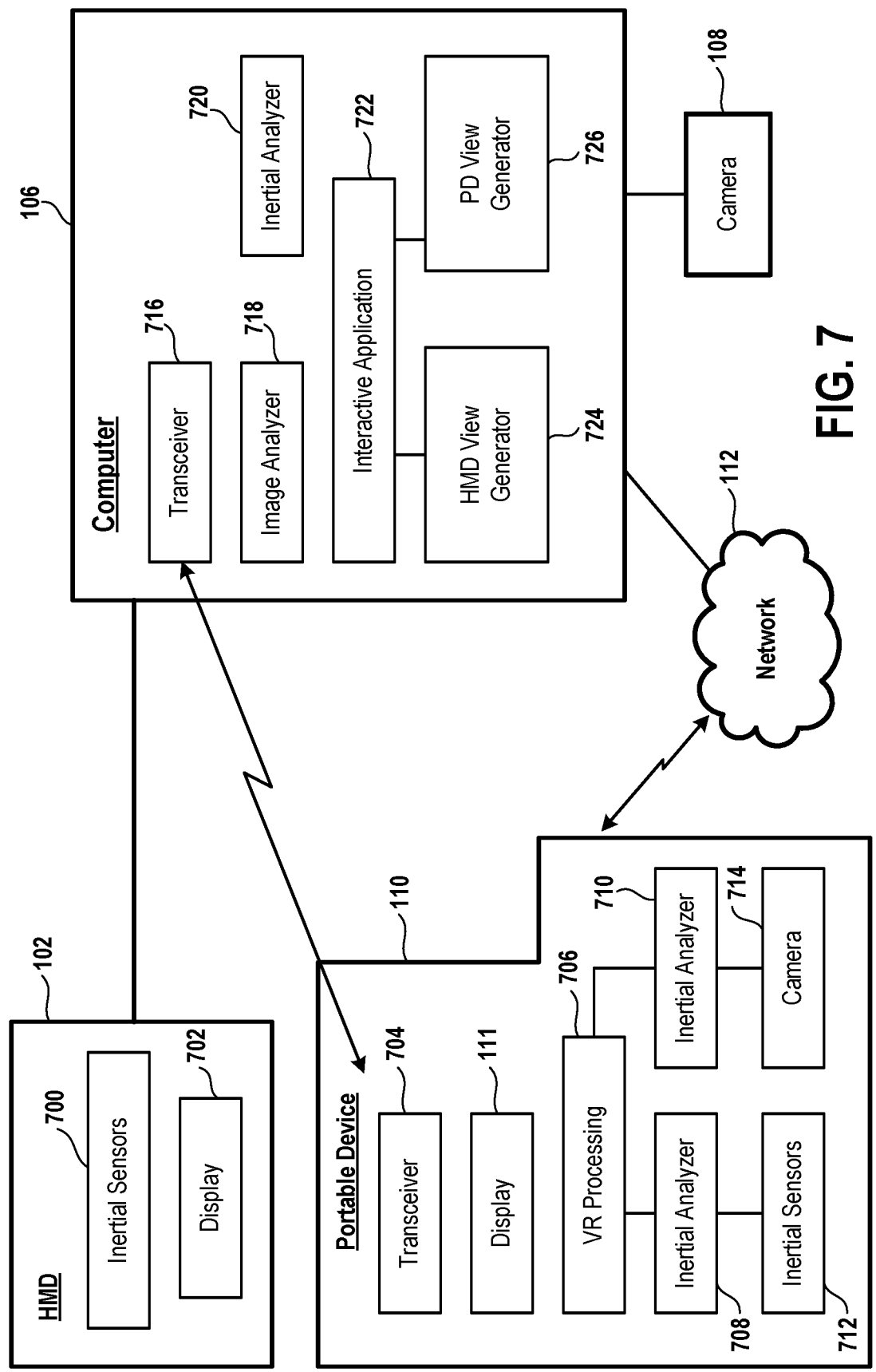
FIG. 7 illustrates a system for viewing a shared VR space via an HMD and a portable device, in accordance with implementations of the disclosure.

FIG. 7 illustrates a system for viewing a shared VR space via an HMD and a portable device, in accordance with implementations of the disclosure. As shown, the HMD includes inertial sensors 700 which are configured to sense movements of the HMD. The HMD 102 also includes a display 702 that is configured to render a view of the VR space from a perspective of a location that corresponds to the location of the HMD 102 in the local interactive real space in which the HMD is disposed.

The HMD 102 is connected to computer 106, which includes an inertial analyzer 720 configured to analyze the inertial data from the HMD's inertial sensors 700 to track the HMD 102. The computer 106 executes an interactive application 722, which in some implementations can be a video game. The interactive application 722 defines the state of the VR space, including the locations and states of objects within the VR space. The HMD view generator 724 generates the view of the VR space that is rendered to the display 702 of the HMD 102.

Additionally, the computer 106 is connected to a camera 108 that captures images of the real space in which the HMD is disposed. The image analyzer 718 of the computer 106 is configured to analyze captured images from the camera 108 to identify and/or track the HMD in the real space. The computer includes a wireless transceiver 716 for wireless communications with, for example, the portable device 110.

The portable device 110 includes a transceiver for wireless communications with, for example, the computer 106. The portable device 110 includes a display 111 that is configured to render a view of the VR space from the perspective of a position in the VR space that corresponds to the position of the portable device in the real space. The portable device 110 includes an inertial analyzer 708 configured to analyze inertial data from one or more inertial sensors 712, to determine and track the location of the portable device. A VR processing module 706 determines the VR position corresponding to the position of the portable device, and sends this information to the computer, which uses a portable device view generator 726 to generate the view of the VR space corresponding to the VR position for rendering to the display 111 of the portable device 110.

The portable device further includes an image analyzer 710 configured to analyze captured images from a camera 714 of the portable device. The captured images can be analyzed to identify and track the position of the HMD in some implementations, to, for example, perform calibration operations as described above, or to improve tracking of the HMD user.

Figure 8:
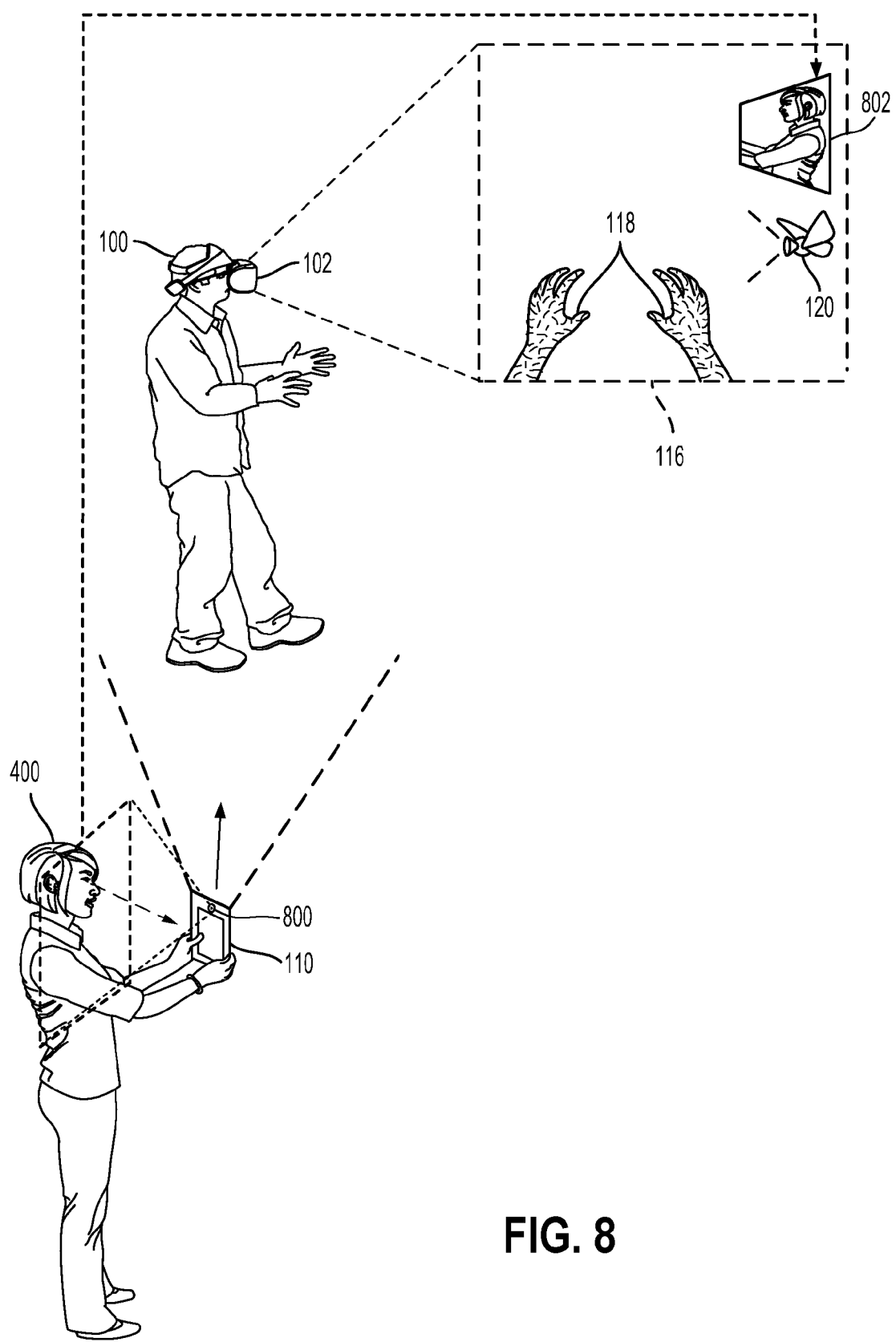
FIG. 8 illustrates two users viewing a shared VR space using an HMD and a portable device, in accordance with implementations of the disclosure.

FIG. 8 illustrates two users viewing a shared VR space using an HMD and a portable device, in accordance with implementations of the disclosure. In the illustrated implementation, the user 100 is provided a view 116 of the VR space through the HMD 102. Simultaneously, the secondary user 400 uses the portable device 110 to also view the VR space. As previously described, the interactive real space is mapped to the VR space, so that when the rear-facing side of the portable device 110 is directed towards the HMD user 100, then the view of the VR space shown on the display of the portable device can include a virtual object such as a character/avatar that is representative of the HMD user 100 in the VR space.

Additionally, the portable device 110 can include a front-facing camera 800 (also referred to as a "selfie" camera) positioned on the same side of the portable device 110 as the display of the portable device. The front-facing camera can be activated to capture images and/or video of the user 400, which can be rendered in the HMD user's 100 view 116 as image/video 802. The captured images/video from the front-facing camera 800 can be transmitted to the computer 106, which can be configured to overlay/present them within the view 116. The image/video 802 can be associated with the indicator 120, and can be similarly positioned as described previously. The image/video 802 can thus provide a real-time view of the additional user 400 to the HMD user 100, allowing the HMD user 100 to, for example, see the additional user's reactions and experience a better sense of the additional user's presence in the context of the shared VR space.

Figure 9:
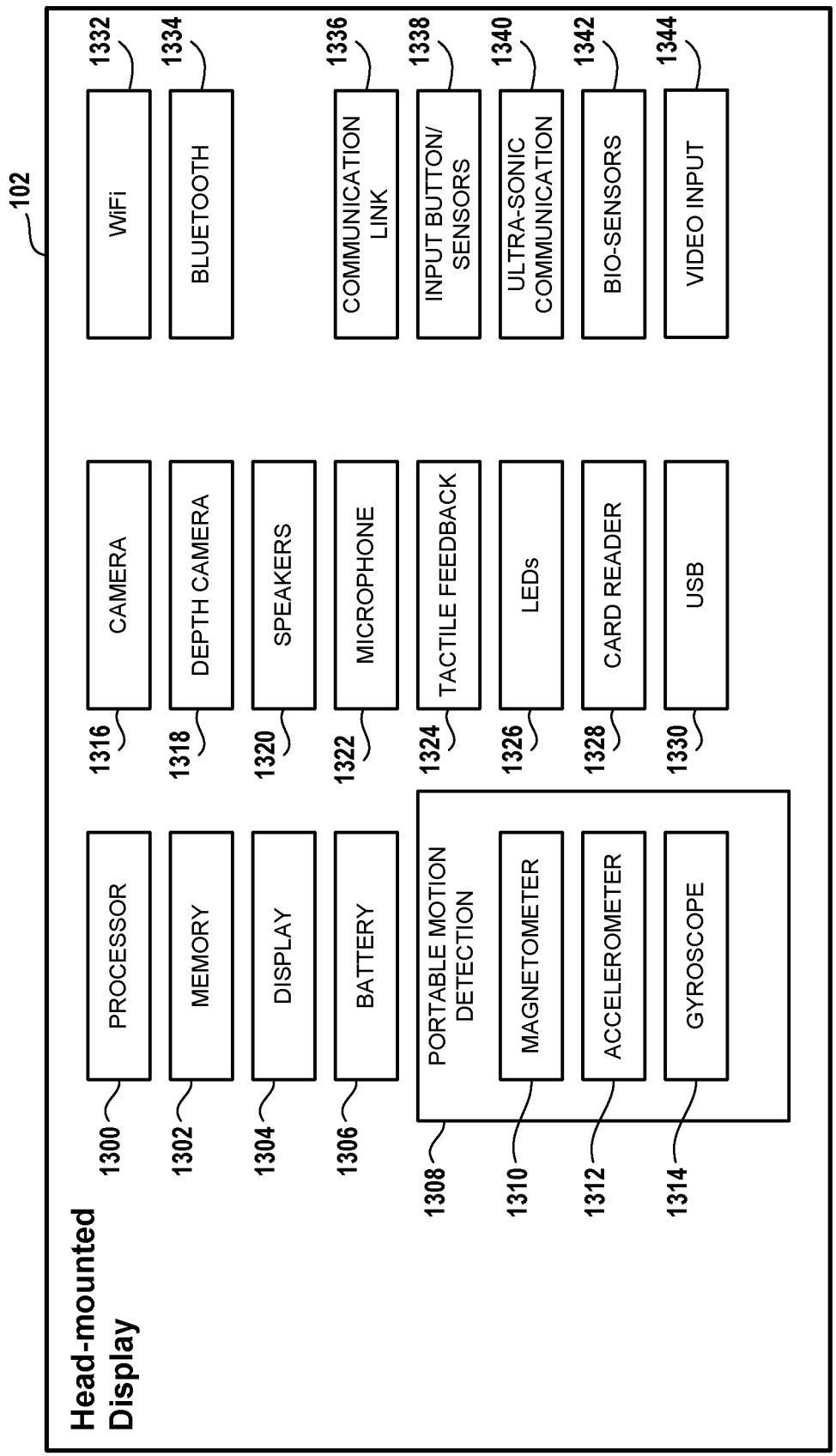
FIG. 9 illustrates components of a head-mounted display, in accordance with an embodiment of the disclosure.

With reference to FIG. 9, a diagram illustrating components of a head-mounted display 102 is shown, in accordance with implementations of the disclosure. It should be appreciated that a portable device in accordance with implementations of the disclosure may have at least some of the same or similar componentry, and is not repeated herein for purposes of brevity. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift over-time without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 10:
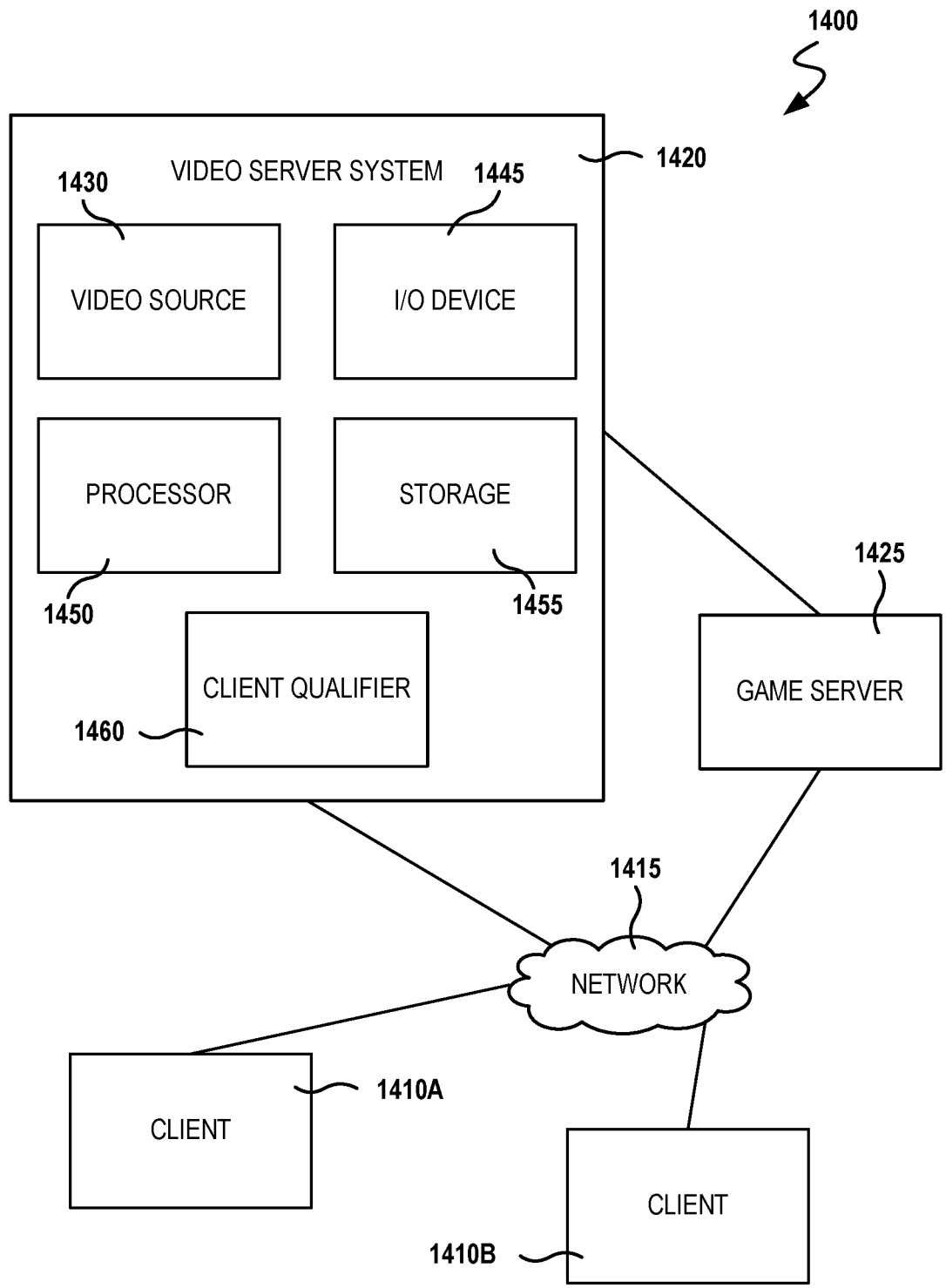
FIG. 10 is a block diagram of a Game System 1400, according to various embodiments of the disclosure.

FIG. 10 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A., 1410B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
   tracking a location of a head-mounted display (HMD) in a real space, the HMD worn by a player in the real space;
   rendering to the HMD a first view of a virtual reality (VR) space of a video game, the first view of the VR space being defined from a perspective determined by the location of the HMD in the real space, the first view being a player view of the video game;
   tracking a location of a portable device in the real space, the portable device being a handheld device operated by a spectator in the real space;
   processing image data from a camera of the portable device to identify the HMD and determine a location of the portable device in the real space relative to the location of the HMD in the real space;
   rendering to the portable device a second view of the VR space, the second view of the VR space being defined from a perspective determined by the location of the portable device in the real space relative to the location of the HMD in the real space, the second view being a non-player spectator view of the video game;
   wherein the first view includes an indicator rendered on the HMD that identifies the second view and the presence of the portable device in the real space;
   wherein the indicator is visibly rendered in the VR space at approximately the location of the portable device from which the second view is defined, the indicator identifying to the player the presence of the spectator viewing the VR space.

2. The method of claim 1, wherein locations in the real space are mapped to locations in the VR space, such that the perspective of the first view is mapped to the location of the HMD in the real space, and the perspective of the second view is mapped to the location of the portable device in the real space.

3. The method of claim 2, wherein the location of the HMD in the real space is mapped to a location of a virtual object in the VR space, such that when a rear-facing side of the portable device, opposite a display side of the portable device, is directed towards the HMD, then the second view is configured to display the virtual object.

4. The method of claim 3, wherein the virtual object is a virtual character or avatar.

5. The method of claim 3, wherein the mapping of locations in the real space to locations in the VR space is changed in response to controller input generated from a controller device operated by a user of the HMD, the controller input being configured to control movement of the virtual object in the VR space.

6. The method of claim 5, wherein in response to controller input effecting a translational movement of the virtual object in the VR space, the mapping of locations in the real space to locations in the VR space is translationally shifted to maintain the mapping of the location of the HMD in the real space to the location of the virtual object in the VR space.

7. The method of claim 1, wherein tracking the location of the HMD in the real space includes processing inertial data generated from at least one inertial sensor of the HMD.

8. The method of claim 7, wherein tracking the location of the HMD in the real space further includes processing image data from a camera configured to capture images of the real space, the image data being processed to identify the image data.

9. The method of claim 1, wherein tracking the location of the portable device in the real space includes processing inertial data generated from at least one inertial sensor of the portable device.

10. The method of claim 9, wherein tracking the location of the portable device in the real space is based on the processing image data from the camera of the portable device.

11. The method of claim 1, further comprising:
    tracking an orientation of the HMD in the real space;
    wherein a direction of the first view of the VR space is defined by the orientation of the HMD in the real space;
    tracking an orientation of the portable device in the real space;
    wherein a direction of the second view of the VR space is defined by the orientation of the portable device in the real space.

12. A method, comprising:
    receiving inertial data from a head-mounted display (HMD), the inertial data being generated from at least one inertial sensor of the HMD;
    receiving image data from a first camera configured to capture images of a real space in which the HMD is disposed, the HMD worn by a player in the real space;
    processing the inertial data and the image data to determine a first view location and a first view direction in a virtual reality (VR) space of a video game;
    generating first video data depicting a player view of the VR space from the first view location in the first view direction;
    transmitting the first video data to the HMD for rendering thereon;
    receiving, from a portable device disposed in the real space, a second view location and a second view direction in the VR space, the second view location being defined based on a location of the portable device relative to a location of the HMD in the real space, that is determined from processing image data from a second camera of the portable device to identify the HMD, the portable device being a handheld device operated by a spectator in the real space;
    generating second video data depicting a non-player spectator view of the virtual environment VR space from the second view location in the second view direction;
    transmitting the second video data to the portable device for rendering thereon;
    wherein the player view includes an indicator rendered on the HMD that identifies the non-player spectator view and the presence of the portable device in the real space;
    wherein the indicator is visibly rendered in the VR space at approximately the location of the portable device from which the second view is defined, the indicator identifying to the player the presence of the spectator viewing the VR space.

13. The method of claim 1, wherein the second view location and the second view direction are determined by the portable device using inertial data generated by at least one inertial sensor of the portable device.

14. The method of claim 1, wherein receiving the second view location and the second view direction and transmitting the second video data occur over a wireless connection with the portable device.

15. The method of claim 1, wherein the indicator is positioned in the VR space at approximately the location of the perspective from which the second view is defined when the perspective is within the first view of the VR space, and wherein the indicator is positioned along a side of the first view on a same side as the perspective when the perspective is not within the first view in the VR space.

* * * * *